Jan. 2, 1962 P. E. V. ALLIN ET AL 3,015,787
WAVEGUIDE CIRCULATOR
Filed Nov. 26, 1958 2 Sheets-Sheet 1

INVENTORS
PHILIP E.V. ALLIN
FREDERICK W. SMITH
BY
AGENT

Jan. 2, 1962 P. E. V. ALLIN ET AL 3,015,787
WAVEGUIDE CIRCULATOR
Filed Nov. 26, 1958 2 Sheets-Sheet 2
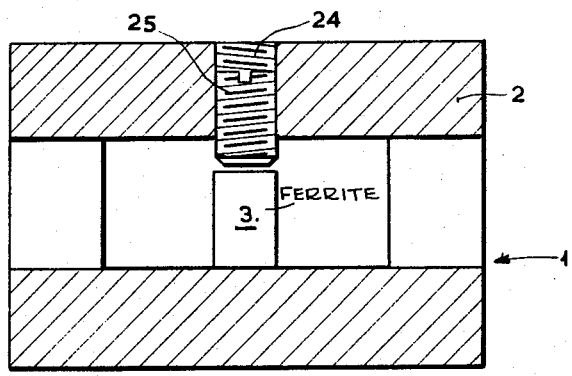
FIG. 4
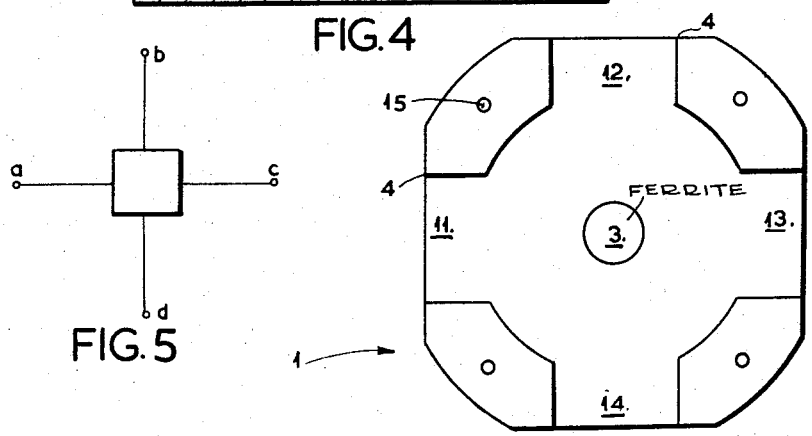
FIG. 5
FIG. 6
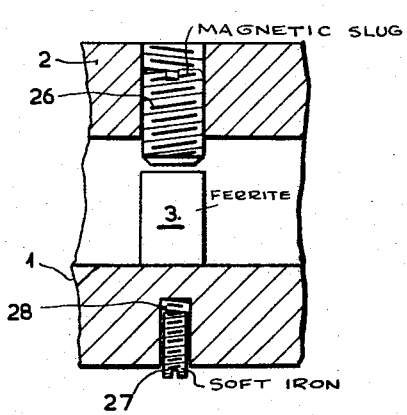
FIG. 7
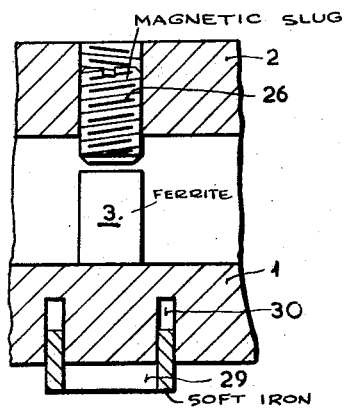
FIG. 8
INVENTORS
PHILIP E.V. ALLIN
FREDERICK W. SMITH
BY
AGENT 3,015,787
WAVEGUIDE CIRCULATOR
Philip Edgar Varnham Allin and Frederick Warren Smith, London, England, assignors to North American Philips Company, Inc., New York, N.Y.
Filed Nov. 26, 1958, Ser. No. 776,464
Claims priority, application Great Britain Dec. 2, 1957
4 Claims. (Cl. 333—9)

This invention relates to waveguide circulators.

According to the invention a four-terminal waveguide circulator comprises two rectangular waveguides which form a junction with each other intermediate their ends and which are aligned in the same plane and at right angles to each other so as to form a cross, together with a prism of ferromagnetic ferrite material disposed within the waveguides at the centre of the said junction with the axis of the prism perpendicular to the said plane.

Preferably the ferrite prism is of symmetrical shape with respect to each of the four arms of the cross formed by the waveguides. Thus for instance the ferrite prism may be cylindrical.

Figure 1:
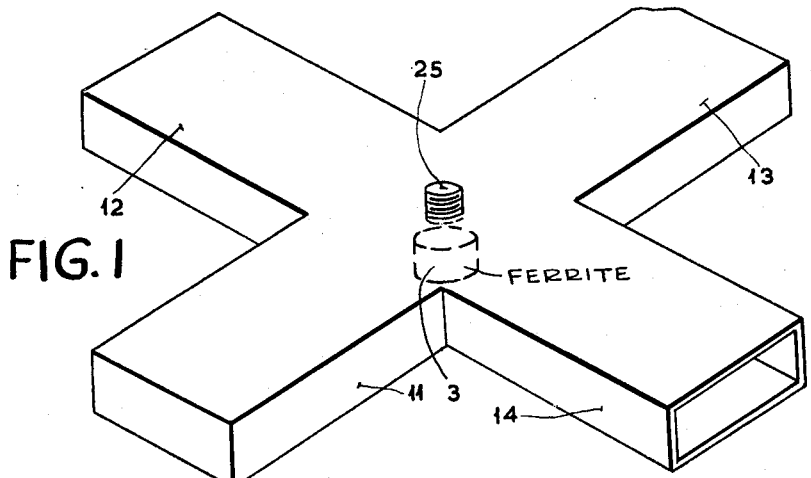
Figure 2:
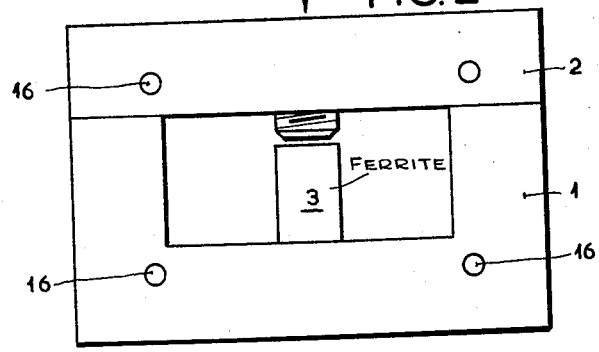
Figure 3:
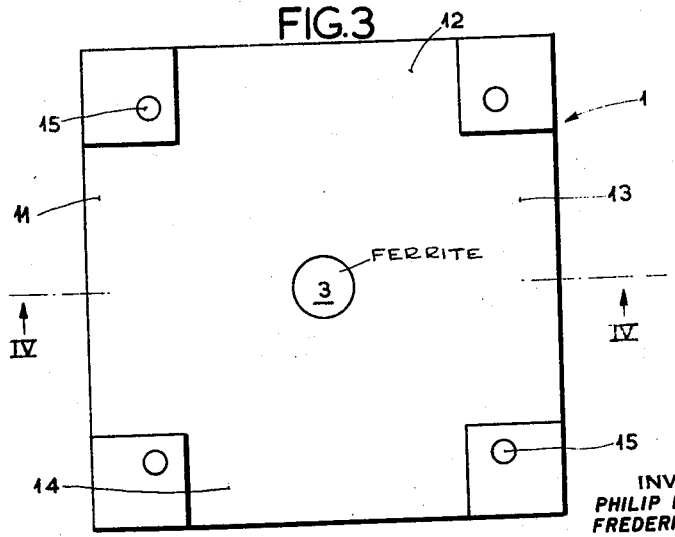

Various embodiment of the invention will now be described with reference to the diagrammatic drawings accompanying the specification wherein:

FIGURE 1 is a simplified drawing of a circulator,
FIGURE 2 is a side view of a circulator according to one embodiment of the invention,
FIGURE 3 is a plan view of the embodiment shown in FIGURE 2 with the top plate removed,
FIGURE 4 is a cross section on the line IV—IV of FIGURE 3 with the top plate in position,
FIGURE 5 shows a schematic circuit of a circulator,
FIGURE 6 is a view, similar to that shown in FIGURE 3, of a second embodiment,
FIGURE 7 is a view, similar to that shown in FIGURE 4, of a portion of a further embodiment and
FIGURE 8 is a view of a portion of a still further embodiment.

In FIGURE 1 of the drawings is illustrated in simplified outline, an arrangement of a four terminal circulator constructed according to the present invention. The circulator has four short waveguide arms 11, 12, 13 and 14 the outer ends of these arms forming the normal "parts" or "terminals" of the circulator. The waveguide arms are arranged in a common plane and in the form of a cross, the angle between each pair of arms being a right angle.

Within the circulator and at the centre of the junction formed between the arms is a short cylindrical piece of ferrite material 3 which is secured by a suitable adhesive to what may in FIGURE 1 be termed the "floor" of the hollow interior of the circulator. Directly above the ferrite material 3 is a brass slug 25 which extends through a threaded aperture in the "roof" of the circulator and is thus adjustable into and out of the interior of the circulator: this brass slug serves to vary the input admittance of the circulator.

Referring now to FIGURES 2, 3 and 4 which illustrate a practical form of a waveguide circulator, main body 1 has formed therein channels 11, 12, 13 and 14 of appropriate size which form short waveguides. A top plate 2 is secured to the main body 1 by means of bolts, not shown, which engage in tapped holes 15 in the main body. Further tapped holes 16 are provided along the four outsides edges of the body 1 and the top plate for securing thereto end flanges of waveguide sections. Thus it will be seen that when the waveguide sections are secured to the circulator the channels 11, 12, 13, and 14 provide extensions of the inside surfaces of the waveguides.

Positioned centrally within the circulator and secured to the lower inside surface of the main body 1 is a cylindrical piece of ferrite material 3 which is secured to the body by means of a suitable adhesive. Positioned centrally in the top plate 2 is a tapped hole 24, shown in FIGURE 4, and within this hole is a threaded brass slug 25 which may be adjusted towards and away from the ferrite material 3 and by means of which the input admittance of the circulator may be adjusted.

In operation a magnetic field is applied in a direction axial of the slug 25 and ferrite material 3 as indicated by the arrow H on the FIGURE 2 and when the field strength H is adjusted to an optimum value the device operates as a circulator. Correct impedance matching is effected by adjustment of the brass slug 25. Referring now to FIGURE 5, with the field strength correctly adjusted substantially all of the power entering at terminal $a$ will travel out of the device at terminal $d$ and little or no signal will appear at terminals $b$ and $c$: it is assumed of course that each of the waveguides attached to terminals $a$, $b$, $c$ and $d$ is correctly terminated.

Two examples of circulators constructed according to FIGURES 2, 3 and 4 will now be given:

*Example I*

The circulator was dimensioned internally for use with a standard waveguide of internal dimensions 0.9" by 0.4". The ferrite material 3 was a magnesium-manganese ferrite: it was 0.25" diameter and 0.3" long. The brass slug 25 was screwed into the circulator until it touched the end face of the ferrite 3. An external field of 250 oersteds was applied. At a frequency of approximately 9,000 mc./s. the power emerging at terminal $d$, FIGURE 5, was 0.9 of the power applied to terminal $a$.

It is not necessary for the circulator to have an externally square cross section and in FIGURE 6 is shown an embodiment wherein the external shape of the circulator approaches that of a circle. The outer surface of the circulator is provided with flat portions 4 so as to enable waveguides readily to be secured to the circulator.

In certain circumstances it may be desirable to dispense with the somewhat bulky magnet which is normally required to produce the external field and this may be effected by using instead of a brass slug 25 a similarly-shaped slug made of a permanent magnetic material. The permanent magnetic material may be, for instance, an alloy such as that known under the registered trademark "Ticonal" (24 Co, 14 Ni, 8 Al, 3 Cu): alternatively it may be a permanent-magnet type of ferrite such as that known under the registered trademark "Magnadur" ($BaFe_{12}O_{19}$). It will usually be preferable to coat the magnetic slug so as to reduce its high frequency losses; thus, for example, the slug may be copper-plated or silver-plated.

In FIGURES 7 and 8 are shown two embodiments using such magnetic slugs. In FIGURE 7, which is a part section similar to the section shown in FIGURE 4, a soft iron screw 27 is adjustable in a tapped hole 28 formed in the main body directly beneath the ferrite material 3. The applied magnetic field is produced by a silver-plated magnetic slug 26 which serves, in a similar manner to the brass slug 25 shown in FIGURES 2 and 4, to adjust the input admittance of the circulators; by adjusting the position of the screw 27 in the tapped hole 28 the strength of the field passing through the ferrite may be adjusted.

The embodiment illustrated in FIGURE 8 is similar to that illustrated in FIGURE 7 in that it also is provided with a magnetic slug 26. The field strength within the ferrite is in this embodiment adjustable by means of a threaded tubular member 29 of soft iron which may be screwed into or out of a tapped annular recess 30. Other minor variations of the embodiments illustrated in FIGURES 7 and 8 are feasible; for instance, the short, tubular soft iron member 29 illustrated in FIGURE 8 may, if preferred, be located in the top plate 2 so as to encircle the slug 26.

What we claim is:

1. A four-terminal waveguide circulator comprising a pair of rectangular waveguides extending in perpendicular relationship in a common plane and forming a junction having a pair of parallel boundary walls, a prism of ferromagnetic ferrite material disposed within said waveguides on one of said boundary walls at the center of said junction, the axis of said prism being normal to said plane and the axial length of said prism being less than the distance between said walls, and an axially adjustable prismatic admittance controlling member threaded in the other boundary wall in axial alignment with said prism, said prismatic member comprising a permanent magnet having a magnetic field directed axially of said prism, said magnetic field having a strength to produce circulator action.

2. A four-terminal waveguide circulator comprising a pair of rectangular waveguides extending in perpendicular relationship in a common plane and forming a junction having a pair of parallel boundary walls, a prism of ferromagnetic ferrite material disposed within said waveguides on one of said boundary walls at the center of said junction, the axis of said prism being normal to said plane and the axial length of said prism being less than the distance between said walls, an axially adjustable prismatic admittance controlling member threaded in the other boundary wall in axial alignment with said prism, said prismatic member comprising a permanent magnet having a magnetic field directed axially of said prism, and means for varying the magnetic field strength in said ferromagnetic prism due to said permanent magnet to provide a field strength to produce circulator action, said means for varying said field strength comprising a soft-iron cylindrical member threaded in a boundary wall of said junction.

3. The waveguide circulator of claim 2 in which said soft iron member has a solid cross section.

4. The waveguide circulator of claim 2 in which said soft iron member has an annular cross section.

References Cited in the file of this patent

UNITED STATES PATENTS

| | | |
|---|---|---|
| 2,540,488 | Mumford | Feb. 6, 1951 |
| 2,820,951 | Jones | Jan. 21, 1958 |
| 2,911,554 | Kompfner et al. | Nov. 3, 1959 |

OTHER REFERENCES

Allen: IRE Transactions on Microwave Theory and Techniques, vol. MTT–4, No. 4, October 1956, pages 223–224.

Weiss: Physical Review, vol. 107, No. 1, July 1, 1957, page 317.

Chang et al.: Proc. of the IRE, vol. 46, No. 7, July 1958, pages 1383–1386.